(12) United States Patent
Wang et al.

(10) Patent No.: US 8,418,156 B2
(45) Date of Patent: Apr. 9, 2013

(54) TWO-STAGE COMMIT (TSC) REGION FOR DYNAMIC BINARY OPTIMIZATION IN X86

(75) Inventors: Cheng Wang, San Ramon, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 12/639,251

(22) Filed: Dec. 16, 2009

(65) Prior Publication Data

US 2011/0145551 A1 Jun. 16, 2011

(51) Int. Cl.
*G06F 9/45* (2006.01)

(52) U.S. Cl.
USPC ........... 717/151; 717/153; 717/154; 717/159; 717/160; 717/161; 712/245; 712/246; 712/247; 712/248; 718/104

(58) Field of Classification Search .......... 717/141–161; 712/245–248; 718/104
See application file for complete search history.

(56) References Cited

U.S. PATENT DOCUMENTS

| | | | | |
|---|---|---|---|---|
| 5,261,071 A | * | 11/1993 | Lyon | 711/140 |
| 5,261,089 A | * | 11/1993 | Coleman et al. | 1/1 |
| 5,465,336 A | * | 11/1995 | Imai et al. | 712/216 |
| 5,467,473 A | * | 11/1995 | Kahle et al. | 712/23 |
| 5,872,990 A | * | 2/1999 | Luick et al. | 712/24 |
| 6,681,387 B1 | * | 1/2004 | Hwu et al. | 717/158 |
| 7,500,087 B2 | * | 3/2009 | Saha | 712/235 |
| 7,519,796 B1 | * | 4/2009 | Golla et al. | 712/225 |
| 7,613,908 B2 | * | 11/2009 | Raikin et al. | 712/220 |
| 7,865,885 B2 | * | 1/2011 | Wu et al. | 717/151 |
| 7,895,407 B2 | * | 2/2011 | Dankel et al. | 711/170 |
| 8,255,626 B2 | * | 8/2012 | Blundell et al. | 711/117 |
| 2002/0147969 A1 | * | 10/2002 | Lethin et al. | 717/138 |
| 2002/0188831 A1 | * | 12/2002 | Jackson et al. | 712/227 |
| 2005/0028148 A1 | * | 2/2005 | Civlin | 717/145 |
| 2005/0125786 A1 | * | 6/2005 | Dai et al. | 717/161 |
| 2007/0136289 A1 | * | 6/2007 | Adl-Tabatabai et al. | 707/8 |
| 2008/0126764 A1 | * | 5/2008 | Wu et al. | 712/226 |

OTHER PUBLICATIONS

C. Scott Ananian et al, Unbounded Transactional Memory, 2005, IEEE, 11th Int'l Symposium on High-Performance Computer Architecture, 1-4.*
Wang et al., TSO-Atomicity: Efficient TSO Enforcement for Aggressive Program Optimization, Intel Labs, 8 pages.
Wang et al., Modeling and Performance Evaluation of TSO-Preserving Binary Optimization, Intel Labs, 10 pages.
Neelakantam, Naveen et al., "Hardware Atomicity for Reliable Software Speculation", International Symposium on Computer Architecture (ISCA, 2007), Jun. 9-13, 2007, San Diego, California, 12 pages.
Rosner, Roni et al. "Power Awareness through Selective Dynamically Optimized Traces", 31st Annual International Symposium on Computer Architecture (ISCA, 2004), 12 pages.

* cited by examiner

*Primary Examiner* — Chat Do
*Assistant Examiner* — Sergio J Curbelo, III
(74) *Attorney, Agent, or Firm* — Grossman, Tucker, Perreault & Pfleger, PLLC (57) ABSTRACT

Generally, the present disclosure provides systems and methods to generate a two-stage commit (TSC) region which has two separate commit stages. Frequently executed code may be identified and combined for the TSC region. Binary optimization operations may be performed on the TSC region to enable the code to run more efficiently by, for example, reordering load and store instructions. In the first stage, load operations in the region may be committed atomically and in the second stage, store operations in the region may be committed atomically.

18 Claims, 5 Drawing Sheets

TWO-STAGE COMMIT (TSC) REGION FOR DYNAMIC BINARY OPTIMIZATION IN X86

FIELD

The present disclosure relates to a dynamic binary optimization, and, more particularly, to a two-stage commit region for dynamic binary optimization in x86.

BACKGROUND

Hardware/Software (SW/HW) Co-Designed Architecture is a promising technique for modern architecture innovation, and dynamic binary optimization is an important component for HW/SW co-designed architecture. With the advance in Transactional Memory (TM) or Hardware Lock Elision (HLE) techniques, there are proposals to leverage atomic regions supported by TM/HLE for dynamic binary optimization. Since the atomic regions are guaranteed to execute atomically, consistently and in isolation, the code within an atomic region can be reordered without the concern of interactions between different threads. However, due to the strict memory order across locked sections, the atomic regions supported by TM/HLE targeting lock elision unnecessarily impose stronger memory order than what is needed for dynamic binary optimization techniques in X86, and the stronger memory order usually leads to inefficient architecture implementation.

In X86, memory instructions retire from a CPU in their program order (i.e. in-order retire). However, retired store data (i.e. senior stores) may be buffered in an internal store-buffer in their program order and written to the cache/memory later. So, execution of memory instructions in X86 may be viewed as having two stages. In the first stage, the memory instructions retire from the CPU and follow their original program order. After the first stage, the store data stays in the store buffer waiting for the second stage. In the second stage, the load instructions do nothing but the store instructions need follow their original program orders to write data back from store-buffer to the cache (i.e. in-order writeback). Thus, in x86 both stages execute in order. Logically, we can view that the load instructions access memory instantly at the end of first stage and the store instructions access memory instantly at the end of second stage. So X86 allows reorder of memory accesses between an earlier store and a later load, if they access different memory. However, x86 does not allow any reorder of memory accesses between two load instructions or two store instructions due to in-order retire and in-order retire-back in both stages. X86 also prohibits reorder of memory accesses between an earlier load and a later store instruction in dynamic binary optimization.

The two stages make X86 much more efficient than architectures implementing sequential consistency. A store instruction can retire without waiting for its data writing back to the cache. That eliminates the expensive stalls on retirement due to the store misses. For supporting strict order of memory access on memory instructions when necessary, X86 allows to use the expensive fence instruction (including lock instructions because in X86, lock instructions also act as a fences for memory instructions across lock instructions) to enforce the strict order of memory access between memory instructions. The implementation of a fence instruction synchronizes the two stages by merging them into one single stage. So, a fence instruction cannot retire until all the senior stores are written to the cache. In this way, one can enforce the strict order of memory accesses on memory instructions across the fence. Of course, there is overhead in fence instruction in waiting for the drain of senior stores.

There have been many advances in Transactional Memory (TM) and Hardware Lock Elision (HLE) techniques. The term "Transactional Memory" refers to attempts to simplify parallel programming by allowing a group of load and store instructions to execute in an atomic manner. A transaction in this context is a piece of code that executes a series of reads and writes to shared memory. These reads and writes logically occur at a single instant in time, thus intermediate states are not visible to other (successful) transactions. The term "Lock Elision" trying to eliminate a lock from program code that contains a lock. Locks can only be removed from inside atomic regions.

Existing TM/HLE techniques implement atomic regions (or transactions). Besides the instruction retirement from CPU, each memory instruction in the atomic region also needs to commit from the speculative cache. All the instructions in an atomic region have either a single stage of atomic commit or complete rollback. Although atomic regions may enable many more binary optimizations, implementation of atomic regions has some inherent inefficiency. One issue encountered when with the implementation of an atomic region in x86 is that the atomic commit requires all of the stores in the region to be drained from the store buffer to the cache before all the memory instructions in the region can commit. Waiting for the draining of stores may stall retirement of any instructions occurring after the atomic region. Since atomic regions are certain to execute atomically, consistently and in isolation, the code within an atomic region can be reordered without the concern for interactions between different threads. However, due to the strict order of memory accesses on memory instructions across locked sections boundary, the atomic regions supported by TM/HLE targeting lock elision unnecessarily impose more strict order of memory accesses than what is needed for dynamic binary optimization in x86. The more strict order usually leads to less efficient architecture implementation.

To date, there has been very little, if any, research and work concerning the development of two commit stages for regions targeting dynamic binary optimization. Existing TM/HLE techniques, targeting speculative lock elision, implement atomic regions with a single stage atomic commit.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

The implementation of atomic regions has inherent inefficiencies. One important overhead associate with the conventional atomic region implemented in X86 is that the atomic commit requires all the stores in the region to be drained from the store buffer to the cache before the region can commit. This may cause a stall for instructions following the atomic region waiting for the draining of store instructions within the region. The single stage of atomic commit unnecessarily imposes more strict order of memory accesses than binary optimization need, and the more strict order usually leads to the less efficient implementation.

The present disclosure provides systems and methods to define a two-stage commit (TSC) region which has two separate stages of commit, instead of the single atomic stage of commit. In the first stage, load operations in the region are committed atomically after the instructions in the region are retired, and in the second stage, store operations in the region are committed atomically after all the stores are written back from the store buffer to the cache. Therefore, there is no need to stall the instructions following retirement by waiting for the draining of stores to commit the whole region, as in the conventional atomic region approach. Instead, instructions that would otherwise retire after the whole region commit are allowed to retire during execution of the second stage of the TSC region (i.e., after the region is committed in the first stage) without waiting for the draining of stores. The TSC region also commits load instructions in the first stage (earlier), which may reduce region aborts due to memory conflicts.

Figure 1:
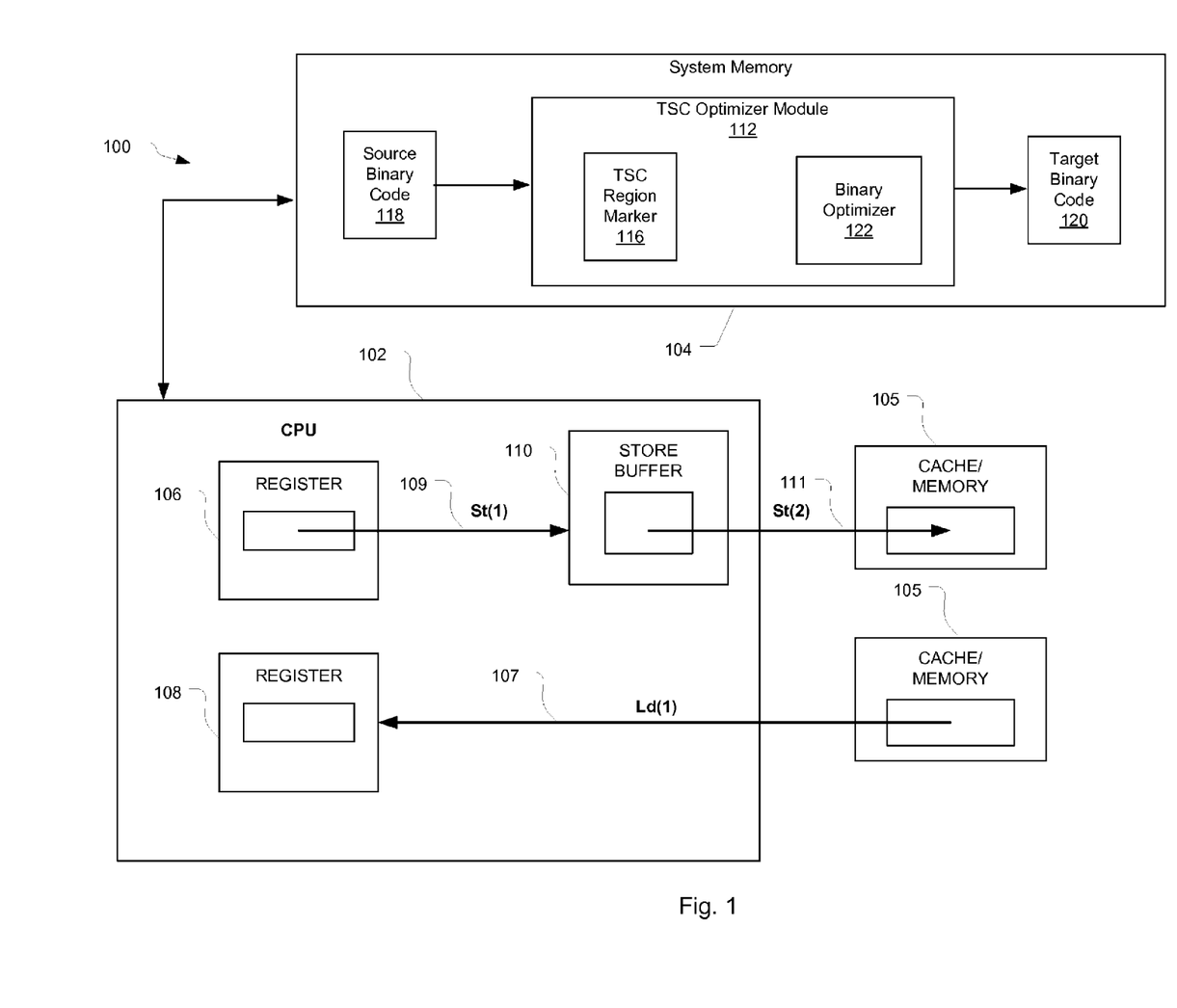
FIG. 1 depicts a memory system consistent with the present disclosure.

FIG. 1 depicts a memory system 100 consistent with the present disclosure. System 100 includes a CPU 102 and system memory 104. The system may also include cache/memory 105 (which may be included with system memory 104). The CPU 102 may include processor registers 106 and 108 and at least one CPU store buffer 110. CPU 102 may include a plurality of core processing units (hereinafter "cores" or singularly "core") and each core may be configured to execute a plurality of threads. System memory 104 may host TSC optimizer module code 112, source binary code 118 and target binary code 120. TSC optimizer module code 112 may include two stage commit (TSC) region marker code 116 and binary optimizer code 122. TSC optimizer module code 112 may be executed by one or more cores to operate on source binary code 118 to transform code 118 into target binary code 120, as will be explained in greater detail below. Transforming source binary code 118 into target binary code 120, in whole or in part, may include defining one or more two stage commit (TSC) regions and performing binary optimization operations within the TSC region, as will be described in detail below.

In operation, memory instructions, including load (Ld) and store (St), may be executed by CPU 102. A load instruction (Ld) may read memory and retire after data associated with the load instruction leaves cache/memory 105 and is loaded into CPU register 108, as the load instruction is executed by the CPU 102, as shown by arrow 107 and designated by Ld(1) in FIG. 1. A store instruction (St) may be retired when data associated with the store instruction is transferred from CPU register 106 to a store buffer 110, as shown by arrow 109 and designated by St(1) in FIG. 1. A retired store instruction shall be referred to herein as a "senior store." The term "retire," as used herein, means that an instruction is executed by the CPU and leaves a CPU queue. The term "access/read/write" refers to a memory transaction being made permanent. Thus, for example, a load instruction reads when the data is loaded into the CPU register and a store instruction writes when data is moved from a CPU store buffer into memory. The store instruction (St) may write memory when the data associated with the store instruction is transferred from the store buffer 110 and written to a cache/memory 105, as shown by arrow 111, and designated by St(2) in FIG. 1. Thus, by convention throughout this disclosure, the number in the parenthesis following the load or store instruction represents the first and second stages, respectively. In both stages, memory instructions may follow their original program order (i.e., in-order retire/in-order write-back).

TSC optimizer module code 112 may be configured to monitor source binary code 118 during runtime and determine lines of code and/or sections of the code 118 that run frequently. Lines of code and/or sections of code that run frequently may be identified as potential targets to define a two stage commit region for dynamic binary optimization techniques. Here, the term "frequently" is defined as a predetermined number executions and/or occurrences per unit time, or a predetermined number of executions and/or occurrences in a given section of code. Of course, those skilled in the art will recognize that certain applications may perform better with greater application of binary optimization techniques than others, and thus, those skilled in the art may define the term "frequently" on a case-by-case basis to maximize the efficiency of a given application/source binary code 118. To that end, TSC optimizer module code 112 may include a counter or other logical mechanism to keep a running count of one or more code sequences (and/or executions) within the source binary code 118. The TSC optimizer module code 112 may compare the count to a predetermined and/or programmable threshold, above which TSC optimizer module code 112 may identify as lines of code and/or sections of code that can be formed into a TSC region.

Once sections and/or lines of source binary code 118 are identified as potential target for application of a TSC region and binary optimization operations, TSC optimizer module code 112 may connect individual lines of code and/or sections of code together to form a TSC region. If the code sequence can be modified into a TSC region, TSC region marker 116 may generate instructions to mark the region as a TSC region that may include generating an instruction indicative of a TSC region beginning and inserting that instruction at the beginning of the region, and/or generating an instruction indicative of a TSC region end and inserting that instruction at the end of the TSC region.

TSC optimizer module 122 is configured to perform binary optimization operations on the TSC region. "Binary optimization," as used herein, is defined as one or more operations which are designed to improve the performance of source binary code. The terms "optimize" and "optimization" referred to throughout this document specifically refer to performing modifications to code. These optimizations are normally performed with the intent to improve the performance throughput of the code, although there are certain optimizations that either have other intents or other results. In certain cases optimizations may be performed on code to modify the resulting output data collected upon execution of the code rather than attempting to improve any performance throughput of the code. Additionally, optimizations could also be performed to modify the data collection capability of performance monitoring code among other goals. In other potential cases, code optimizations could be introduced into the code with the intent to achieve a gain in performance throughput of the code, only to not achieve a gain whatsoever and possibly result in an unwanted performance degradation due to unforeseen circumstances. Therefore, the terms "optimize" and "optimization" do not specifically refer to an optimal configuration of code that will achieve ideal performance. It is not necessarily the case, that any "optimization", as referred to within this document, performed on a segment of code could possibly result in truly optimal performance (i.e. the best theoretical performance throughput). Rather, references to "optimizing" and "optimizations" within this document connote attempts at restructuring code to either potentially gain some level of performance improvement over the original code or to modify some other aspect of the code for the benefit of the user (e.g. modifying the resulting output as referred to above). If the "optimization" was meant to achieve a performance improvement, then whether a real performance improvement is achieved is entirely dependent upon the types of modifications performed, the specific structure and behavior of the original code, and the environment in which the code is executed within. Exemplary binary optimization operations include memory operations, for example, reordering load and/or store instructions, and non-memory operations such as eliminating "dead" or unused code, or otherwise streamlining the source binary code.

Once a TSC region is generated for the identified code, and the code is optimized using binary optimization operations, the code may be separated into target binary code 120, now optimized for the given operating environment. If the TSC region aborts, the TSC region may be rolled back and the original binary source code source 118 may be executed without binary optimization.

Figure 2:
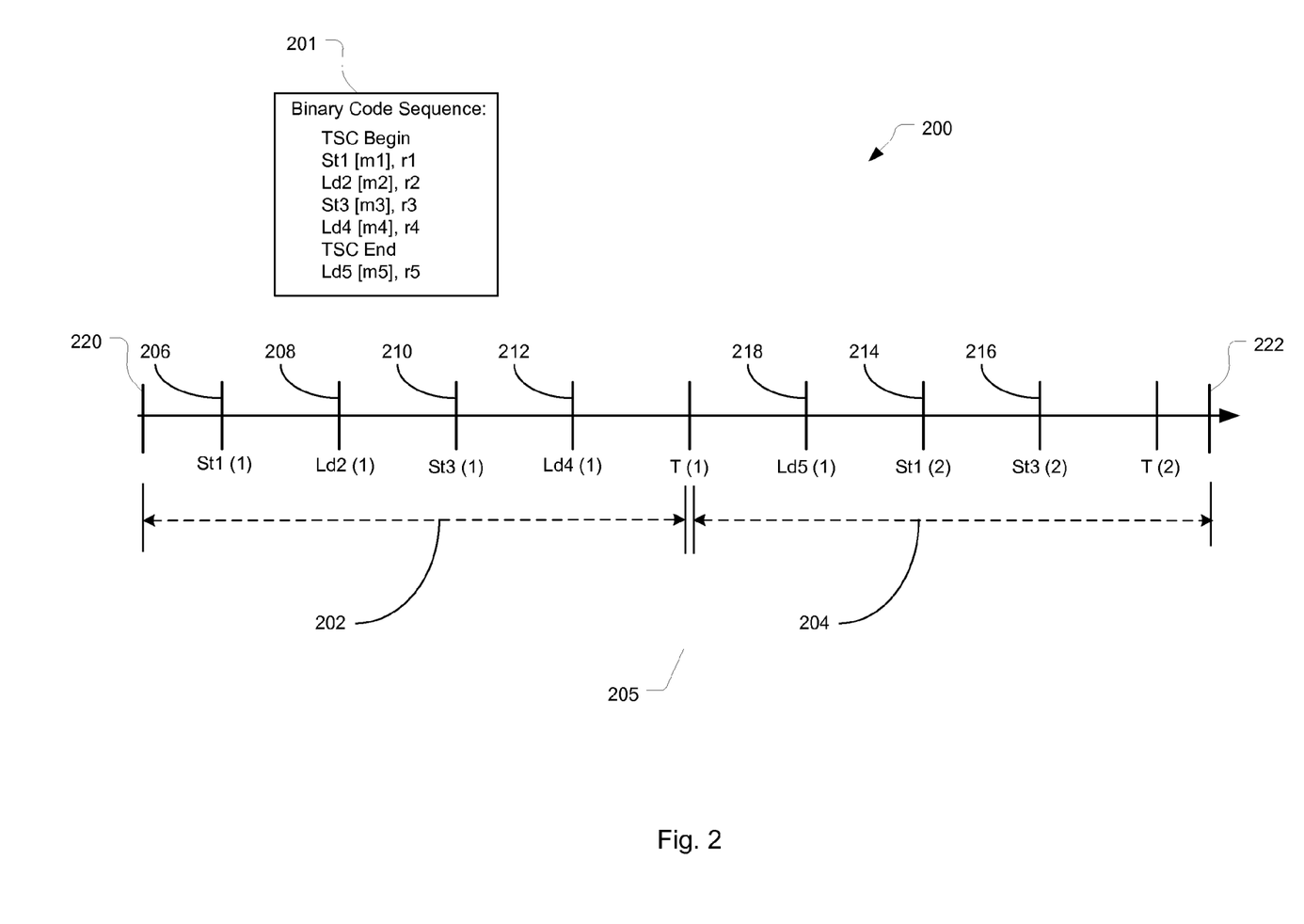
FIG. 2 depicts a diagram illustrating exemplary execution of optimized code in the two stage commit (TSC) region consistent with the present disclosure.

FIG. 2 depicts a diagram 200 illustrating exemplary execution of optimized code in the two stage commit (TSC) region consistent with the present disclosure. As shown in FIG. 2, a binary code sequence 201, including store and load instructions, may include St [m1], r1 and Ld2 [m2], r2, wherein data associated with a store instruction (St1) may be transferred from a processor register (r1) and written to a cache/memory location (m1) and data associated with a load instruction (Ld2) may be read from a cache/memory location [m2] and loaded into a processor register (r2). The binary code sequence may also include St3 [m3], r3 and Ld4 [m4], r4, wherein data associated with a store instruction (St3) may be transferred from a processor register (r3) and written to a cache/memory location (m3) and data associated with a load instruction (Ld4) may be read from a cache/memory location [m4] and loaded into a processor register (r4). It is assumed in this example that the binary code sequence 201 has been optimized using binary optimization operations, as detailed above.

FIG. 2 provides an example of a TSC region execution of the optimized binary code sequence (St [m1], r1; Ld2 [m2], r2; St3 [m3], r3; Ld4 [m4], r4). Generally, store instructions (St1 and St3) may be retired and load instructions (Ld2 and Ld4) may read and retire in a first stage 202 of a TSC region 205. Store instructions St1 and St3 may write in the second stage 204. A marker 220 may be inserted at the beginning of the region to signify the beginning of the TSC region 205 and a marker 222 may be inserted at the end of the region to signify the end of the TSC region 205. Markers 220 and 222 may operate to instruct the CPU executing the code 201 to execute as in a two stage commit manner.

Instructions in the first stage 202 may occur in their program order, i.e., the order of the binary code sequence 201. In particular, a store instruction (St1) in a first stage (St1(1)) 206 occurs before a load instruction (Ld2) in a first stage (Ld2 (1)) 208. Ld2(1) 208 occurs before a store instruction (St3) in a first stage (St3(1)) 210. St3(1) 210 occurs before a load instruction (Ld4) in a first stage (Ld4(1)) 212. Store instructions may occur in second stage in their program order. In particular, a store instruction (St1) in a second stage (St1(2)) may occur before a store instruction (St3) in a second stage (St3 (2)) 208. The TSC region first stage commit occurs after the instructions are retired in first stage. In particular, TSC region (T) in first stage (T(1)) occurs after the instructions in first stage (St1(1)) 206, (Ld2(1)) 208, (St3(1)) 210 and (Ld4 (1)) 212 retire. The TSC region second stage commit may occur after the stores are written back in second stage. In particular, TSC region (T) in second stage (T(2)) 220 occurs after stores in second stage (St1(2)) 214 and (St3(2)) 216. In this example, we assume that St1, Ld2, St3 and Ld4 is the optimized code sequence in the two stage commit region 205 (using binary optimization operations), and that the instruction Ld5 follows the region 205.

One advantage of a TSC region 205 as described herein is that the store operations may be committed after the first stage 202 and therefore memory operations following the region do not need to wait to for the stores to drain. This may enable, for example, additional memory instructions, following the optimized code sequence, to be executed in the second stage 204 of the TSC region 205. For example, a load instruction Ld5 may be permitted to retire 218 in the second stage 204, even though the instruction Ld5 is not part of the optimized code sequence 201. Store instructions St1(2) and St3(3) may write back 214, 216 (respectively) in the second stage 204, regardless of Ld5(1) being inserted in the second stage 204. Unlike the execution of a code in an atomic region, after the first stage 202, a memory instruction after the TSC region can be retired without the risk of stalling because there is no need to wait for the senior store instructions (e.g., St1(1) and St3(1)) to drain.

Thus, in the first commit stage 202 in a TSC region 205, the load instructions in the region may be committed atomically and in a second commit stage 204, the store instructions in the region may be committed atomically. Of course, speculative cache (not shown) may be used to buffer data associated with memory instructions (i.e., load/store instructions) in the TSC regions 205. A cache coherence protocol may also be used to snoop possible conflicting memory instructions in other threads during execution of TSC region 205. IA cache coherence protocol may ensure the data in the caches of each core to be coherent with the shared memory. The TSC region may leverage cache coherence to ensure the memory operations to either commit atomically or rollback without effect.

The first commit stage 202 of a TSC region 205 may occur after load instructions and store instructions retire from a CPU. In a first commit stage, data associated with a load instruction can be read from an appropriate location in cache/memory and then loaded into a register, and the load instruction is retired. Data associated with a store instruction can be moved from a register and written to a store buffer, and the store instruction is retired. After the first commit stage, however, data associated with the retired store instruction (senior store) may remain in a store buffer waiting to be written to cache/memory in a second commit stage. After the first commit stage, snooping may no longer be necessary for load instructions in the TSC region 205 because all load instructions in the region are already committed. Snooping may be used, however, for store instructions in the TSC region 205 until the second commit stage of the TSC region occurs. Snooping may be used, for example, to determine whether any other core is writing (executing store instructions) to the same cache/memory location in the second commit stage.

Due to the two separate commit stages 202, 204 (first and second commit stages), the overall TSC region 205 may no longer be atomic, because other threads may write to the same memory locations and conflict with the loads in the TSC region between the two stages of commit without causing the region to be rolled back. However, the load instructions commit atomically in the first region 202 and store instructions commit atomically in the second region 204.

Figure 3:
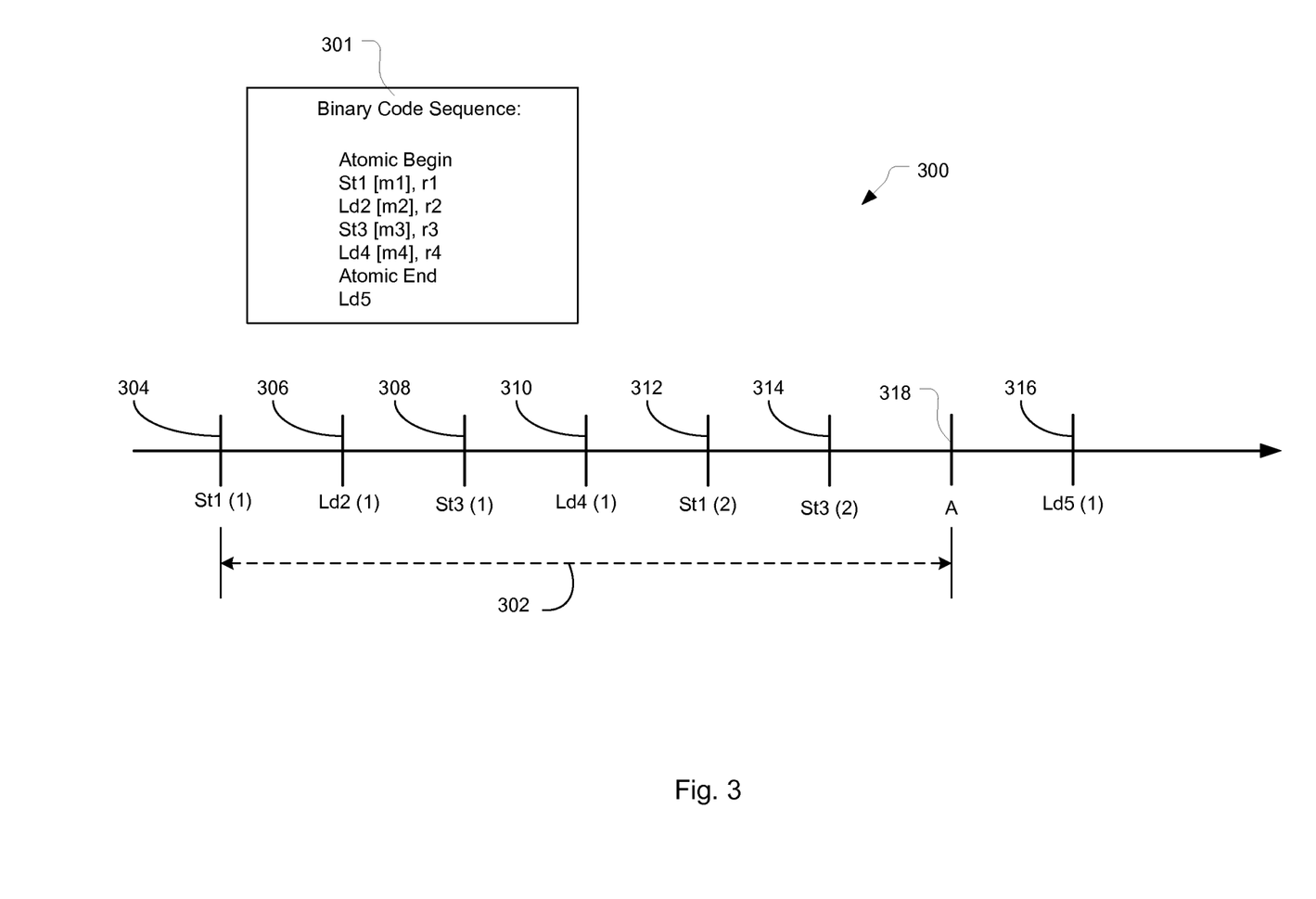
FIG. 3 depicts a diagram illustrating an example of execution of the code sequence of FIG. 2 if this code were being applied to a conventional atomic region.

FIG. 3 depicts a diagram 300 illustrating an example of execution of the optimized code sequence described above with reference to FIG. 2, if this code were being applied to a conventional atomic region. Specifically, FIG. 3 provides an example of an atomic region execution of the binary code sequence (St [m1], r1; Ld2 [m2], r2; St3 [m3], r3; Ld4 [m4], r4). Generally, store instructions (St1 and St3) and load instructions (Ld2 and Ld4) may be retired and/or committed in the single stage of the atomic region 302, where marker A marks the end region of the single stage 302. Unlike the execution of code in a TSC region described above, however, the retirement of Ld5(1) (an instruction that is after the atomic region 302) must be stalled until all memory instructions in the single stage of the atomic region 302 retire and/or commit. Thus, Ld5(1) can only retire after the entirety of the atomic region A 302 commits.

Advantageously, and comparing the operations of the TSC region of FIG. 2 vs. the atomic region of FIG. 3, to commit the entire TSC region 205, there is no need to stall retirement of memory instructions after of the TSC region until all the store instructions in the TSC region are written to the speculative cache (as would be required if the entire region were atomic). Instead, memory instructions after the TSC region are able to retire after the first commit stage 202 of TSC region 205. Memory instructions after the TSC region can occur during the second commit stage execution of the TSC region. The TSC region described herein also may have the advantage to commit load instructions earlier in memory order, potentially reducing any region abort due to possible memory conflicts. In particular, if memory accesses in other threads that conflict with Ld2 or Ld4 happen between T(1) and T(2) or in A, the atomic region A will abort but the TSC region 205 may not.

Although TSC regions described herein may have a weaker memory order than conventional atomic regions, TSC regions as described herein may also enable reorder of memory instructions within a TSC region without concern of interactions between different threads. Thus, binary optimization operations for the TSC region of the present disclosure may permit reorder between an earlier store instruction and a later load instruction. Unlike the conventional memory model in x86, the atomicity among load instructions in the first stage of the TSC region may allow arbitrary reordering between load instructions, and the atomicity among store instructions in the second stage of the TSC region may allow arbitrary reordering between store instructions. The TSC region described herein may also allow reorder between an earlier load instruction and a later store instruction, because the two commit stages in a TSC region may ensure that the load instruction commits earlier than the store instruction.

A fence instruction may exist when applying binary optimization operations to the TSC region of the present disclosure. In one embodiment, the fence instruction inside the TSC region may retire after the store instructions (in the region) are written to speculative cache. This may help enforce a strict memory order across fence instructions. Thus, fence instructions within a TSC region may restrict the reorder between an earlier store instruction and a later load instruction to across fence instructions. In experiments performed by the Applicants, the restriction on the fence instruction in a TSC region has very little effect on dynamic binary optimization operations within the region, since fences and locks are infrequently used in X86 applications.

TSC regions can co-exist with atomic regions for lock elision techniques. For example, the TSC optimizer 112 (FIG. 1) may be configured to analyze the region code and determine whether or not the region has fences. If there are no fences in the region, the region can be optimized and executed efficiently as the TSC region. If there are fences in the region, the TSC optimizer 112 may trade off the benefit of treating the region as atomic region to take advantage of the lock elision or treating it as a TSC region to take advantage of the efficient region commit. If the commit benefit is higher than the fence overhead, the region can be marked as a TSC region. If the lock elision gain is better than the commit benefit, the region can be marked as atomic region and the region can be optimized (including, for example, by ignoring the fence semantics). Moreover, the TSC region described herein may be more efficient to implement than conventional atomic regions. This may be attributed to the fact that there is no need to stall retirement and/or commitment of memory instructions after the TSC region until all the store instructions in the TSC region are written to the speculative cache. Instead, memory instructions after the TSC region may be able to retire and/or commit after the first commit stage of TSC region. Also, without the need for snooping for load instructions after the first commit stage of a region, the TSC regions described herein may reduce unnecessary region aborts due to potential memory conflict. This has to potential to improve performance in multithread applications when data racing, or false data racing due to cache line granularity conflict detection, occurs.

Figure 4:
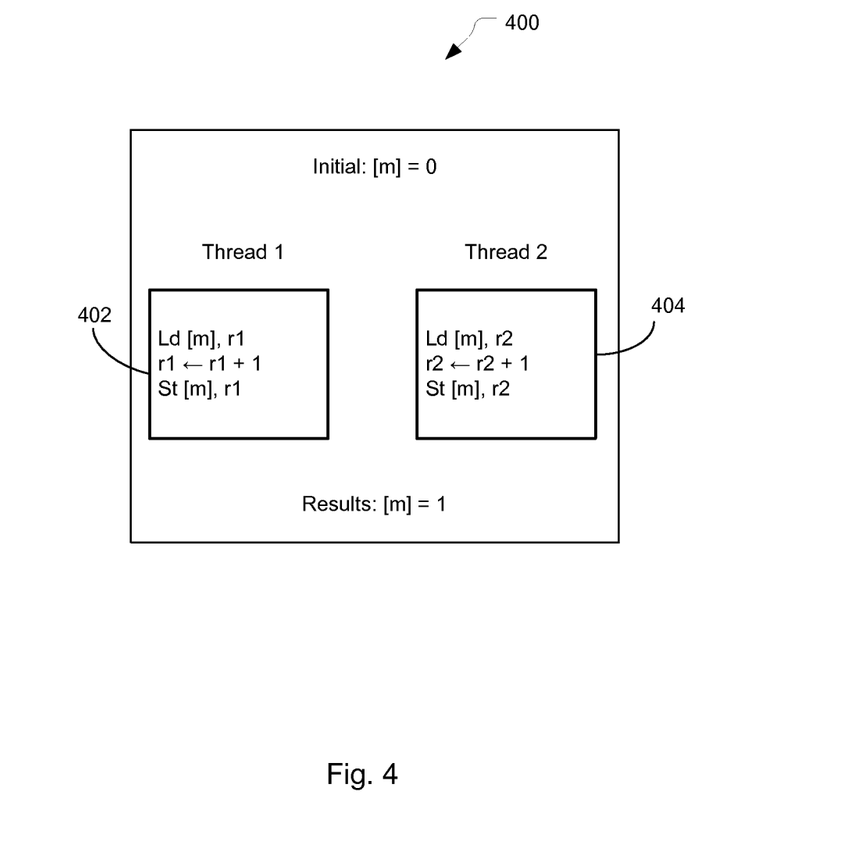
FIG. 4 depicts a diagram illustrating exemplary multi-threaded execution of code in a two stage commit region consistent with the present disclosure.

FIG. 4 depicts a diagram 400 illustrating exemplary multi-threaded execution of code in a two stage commit region consistent with the present disclosure. It assumed for purposes of this example that a memory location [m] has an initial value of zero prior to execution of code 402 and 404. Code 402 may be executed in a first thread (Thread 1) and code 404 may be executed in a second thread (Thread 2), where each thread is operating at memory location [m]. Code 402 in this example may include the following memory instructions: Ld [m], r1; r1←r1+1; St[m], r1; meaning data associated with a load instruction (Ld) may be read from a cache/memory location [m] and loaded into a processor register (r1), the processor register (r1) may be incremented by a value of 1, and data may be stored into cache/memory location [m] from register r1. Code 404 in this example may include the following memory instructions: Ld [m], r2; r2←r2+1; St [m], r2; meaning that data associated with a load instruction (Ld) may be read from a cache/memory location [m] and loaded into a processor register (r2), the processor register (r2) may be incremented by a value of 1, and data may be stored into memory location [m] from processor register (r2).

As a result of the execution of code 402 and 404 in both threads (Threads 1 and 2), data is written to memory [m]. Consistent with the present disclosure, if threads (Threads 1 and 2) are interleaved in TSC region as described herein, upon execution of code 402 in Thread 1 and code 404 in Thread 2, memory (m) will have a resulting value of 1. If Threads 1 and 2 are interleaved and load instruction occurs in Thread 2 (data associated with the load instruction is read from memory (m) and loaded into a processor register (r2) before store instruction retires in Thread 1, then the memory instructions (load/store instructions) are able to overlap and combine values, thus the memory (m) may have a resulting value of 1. The resulting value of 1 for memory (m) may occur for code regions that do not exist inside a locked section of code sequence.

In contrast, memory location [m] will not have a resulting value of 1 if code 402 and 404 are executed in both threads (Threads 1 and 2) in respective conventional atomic regions. Instead, memory [m] would have a resulting value of 2. This is because code 402 and 404, if atomic, must execute atomically (all or nothing), there is no possibility for overlap between Threads 1 and 2 when executing in atomic regions. The execution of code 402 in an atomic Thread 1 will result in a value of 1, as will the execution of code 404 in an atomic Thread 2. Thus, the resulting value of memory [m] would be 2. This example demonstrates that atomic regions impose stronger memory order requirement for dynamic optimizations, as both results 1 and 2 in location [m] are correct and atomic region allows only 2 as the result.

Figure 5:
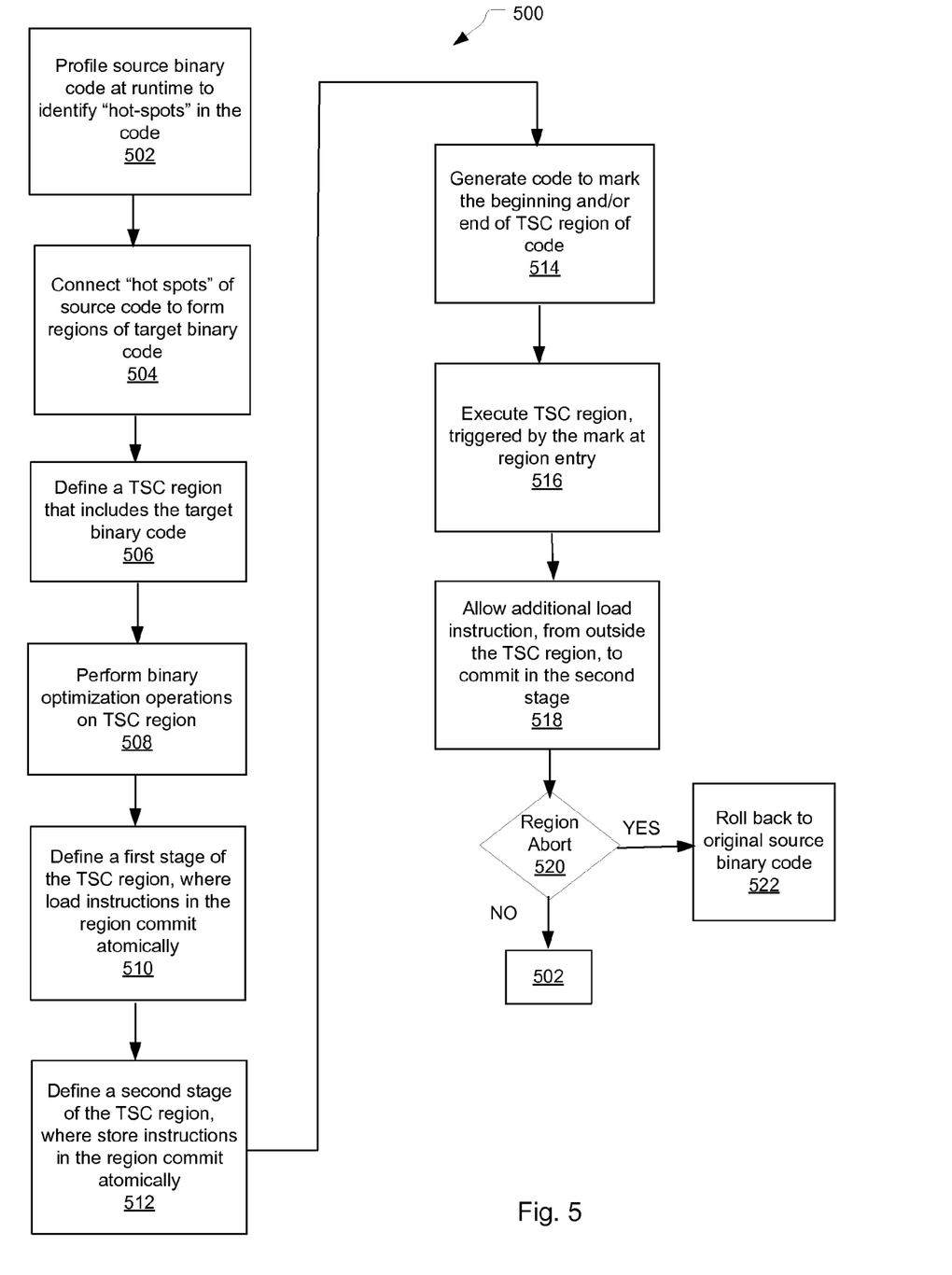
FIG. 5 depicts a flowchart of exemplary operations consistent with the present disclosure.

FIG. 5 depicts a flowchart 500 of exemplary operations according to one embodiment of the present disclosure. Operations of this embodiment may include profiling source binary code at runtime to identify "hot-spots" in the code 502. Here, a "hot-spot" is an instruction or block of code that executes frequently, as described above. Operations may also include connecting "hot spots" of source code to form regions of target binary code 504 and forming a TSC region that includes the target binary code 506. Operations may also include performing binary optimization operations (e.g., reordering memory instructions) on the TSC region 508. Regarding the TSC region formation, operations according to this embodiment may also include defining a first stage of the TSC region where load instructions commit atomically 510, and a second stage of the TSC region where store instructions commit atomically 512. This embodiment may also include generating code to mark the beginning and/or end of the TSC region 514. Execution of the TSC region may be triggered by the marker at the region entry 516. An additional load instruction (from outside the TSC region) may be inserted into the second stage of the TSC region, and allowed to commit in the second stage 518. During execution, if the TSC region aborts 520, operations of this embodiment may also include rolling back to the original source binary code for execution 522. If the TSC region executes successfully, operations of this embodiment may further include continuing runtime analysis of the source binary code, such as described herein starting at operation 502.

Of course, while FIG. 5 depicts exemplary operations according to one embodiment, it is to be understood that in other embodiments all of the operations depicted in FIG. 5 may not be necessary. Indeed, it is fully contemplated herein that other embodiments of the present disclosure may include subcombinations of the operations depicted in FIG. 5 and/or additional operations, are fully contemplated herein. Thus, claims directed to features and/or operations that are not exactly shown in one drawing are deemed within the scope and content of the present disclosure.

Memory 104, cache/memory 105 and store buffer 110 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, Memory 104, cache/memory 105 and store buffer 110 may comprise other and/or later-developed types of computer-readable memory.

Embodiments of the methods described herein may be implemented using a processor and/or other programmable device. To that end, the methods described herein may be implemented on a tangible computer readable medium having instructions stored thereon that when executed by one or more processors perform the methods. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

Unless specifically stated otherwise, as apparent from the preceding discussions, it is appreciated that throughout the specification discussions utilizing terms such as "operations," "processing," "computing," "calculating," "determining," or the like, refer to the action and/or processes of a computer or computing system, or similar electronic computing device or apparatus, that manipulate and/or transform data represented as physical, such as electronic, quantities within the computing system's registers and/or memories into other data similarly represented as physical quantities within the computing system's memories, registers or other such information storage, transmission or display devices.

What is claimed is:

1. A method, comprising:
   loading source binary code for execution by a computer system, the computer system comprising memory and a processing unit comprising a plurality of registers and at least one store buffer;
   identifying, during runtime of said source binary code, a plurality of frequently executed memory instructions within said source binary code, the frequently executed memory instructions include a plurality of store instructions and a plurality of load instructions;
   defining a two stage commit (TSC) region that includes the frequently executed memory instructions and performing binary optimization operations on the plurality of memory instructions within the TSC region;
   generating entry marker code and inserting the entry marker code at the beginning of the TSC region, the entry maker code causing said processing unit to begin processing in a TSC mode;
   generating end marker code and inserting the end marker code at the end of the TSC region, said end maker code causing said processing unit to stop processing in a TSC mode;
   defining a first stage of the two stage commit (TSC) region wherein, when executed by the processing unit, the plurality of load instructions commit atomically in the first stage, and the plurality of store instructions retire in the first stage;
   defining a second stage of the TSC region for the frequently executed block of code, wherein the plurality of store instructions commit atomically in the second stage;
   and allowing at least one additional load or store memory instruction from outside of the TSC region to retire in the second stage of the TSC region.

2. The method of claim 1, wherein the binary optimization operations includes reordering of load and store instruction within the plurality of frequently executed instructions.

3. The method of claim 1, further comprising:
   identifying a fence instruction within the plurality of frequently executed instructions and wherein said binary optimization operations further comprise restricting reordering of load instructions and/or store instructions across the fence instruction.

4. The method of claim 1, further comprising:
   executing, by the processing unit, the TSC region, and if an abort occurs during execution of the TSC region the method further comprises returning to the original source binary code.

5. The method of claim 1, wherein the processing unit further comprises a plurality of cores, and the method further comprises determining, for at least one of the load instructions during the first stage of the TSC region, whether a memory location being accessed by the load instruction is being accessed by more than one of the cores during execution.

6. The method of claim 1, wherein the processing unit further comprises a plurality of cores, and the method further comprises determining, for at least one of the store instructions during the second stage of the TSC region, whether a memory location being accessed by the store instruction is being accessed by more than one of the cores during execution.

7. The method of claim 1, further comprising: establishing an execution threshold for the load and store instructions; monitoring the load and store instructions during runtime and counting the number of executions thereof, and wherein, the frequently executed load and store instructions are instructions that exceed the execution threshold.

8. The method of claim 1, wherein the plurality of load instructions commit atomically in the first stage when data associated with the load instructions is moved from a memory location into one or more registers;
wherein the plurality of store instructions retire in the first stage when data associated with the store instructions is moved from one or more registers to one or more locations in the store buffer;
and wherein the plurality of store instructions commit atomically in the second stage when data associated with the store instructions is moved from the store buffer to memory.

9. An article, comprising a tangible storage medium excluding propagation signals, having instructions stored thereon which when executed by a processor result in the following operations comprising:
loading source binary code for execution;
identifying, during runtime of said source binary code, a plurality of frequently executed memory instructions within said source binary code, the frequently executed memory instructions include a plurality of store instructions and a plurality of load instructions;
defining a two stage commit region that includes the frequently executed memory instructions and performing binary optimization operations on the plurality of memory instructions within the region;
generating entry marker code and inserting the entry marker code at the beginning of the TSC region, the entry maker code causing said processing unit to begin processing in a TSC mode;
generating end marker code and inserting the end marker code at the end of the TSC region, said end maker code causing said processing unit to stop processing in a TSC mode;
defining a first stage of a two stage commit (TSC) region for the frequently executed block of code wherein the plurality of load instructions commit atomically in the first stage and the plurality of store instructions retire in the first stage;
defining a second stage of said TSC region for the frequently executed block of code wherein the plurality of store instructions commit atomically in the second stage;
and allowing at least one additional memory instruction from outside of the TSC region to retire in the second stage.

10. The article of claim 9, wherein the binary optimization operations includes reordering of load and store instruction within the plurality of frequently executed instructions.

11. The article of claim 9, wherein the instructions that when executed by the processor result in the following additional operations comprising: identifying a fence instruction within the plurality of frequently executed instructions and wherein said binary optimization operations further comprise restricting reordering of load instructions and/or store instructions across the fence instruction.

12. The article of claim 9, wherein the instructions that when executed by the processor result in the following additional operations comprising: executing, by the processing unit, the TSC region, and if an abort occurs during execution of the TSC region the method further comprises returning to the original source binary code.

13. The article of claim 9, wherein the processor comprises a plurality of cores, and wherein the instructions that when executed by the processor result in the following additional operations comprising: determining, for at least one of the load instructions during the first stage of the TSC region, whether a memory location being accessed by the load instruction is being accessed by more than one of the cores during execution.

14. The article of claim 9, wherein the processor comprises a plurality of cores, and wherein the instructions that when executed by the processor result in the following additional operations comprising: determining, for at least one of the store instructions during the second stage of the TSC region, whether a memory location being accessed by the store instruction is being accessed by more than one of the cores during execution.

15. The article of claim 9, wherein the instructions that when executed by the processor result in the following additional operations comprising: establishing an execution threshold for the load and store instructions; and monitoring the load and store instructions during runtime and counting the number of executions thereof, and wherein, the frequently executed load and store instructions are instructions that exceed the execution threshold.

16. A system, comprising:
a processing unit comprising a plurality of registers and at least one store buffer;
and a memory configured to host two stage commit (TSC) optimizer code and source binary code to be executed on the processor, wherein when the TSC optimizer code is executed on the processor the TSC optimizer code causes the processor to:
identify, during runtime of said source binary code, a plurality of frequently executed memory instructions within said source binary code, the frequently executed memory instructions include a plurality of store instructions and a plurality of load instructions;
define a two stage commit region that includes the frequently executed memory instructions and performing binary optimization operations on the plurality of memory instructions within the region;
generate entry marker code and inserting the entry marker code at the beginning of the TSC region, the entry maker code causing said processing unit to begin processing in a TSC mode;
generate end marker code and inserting the end marker code at the end of the TSC region, said end maker code causing said processing unit to stop processing in a TSC mode;
define a first stage of a TSC region for the frequently executed block of code wherein the plurality of load instructions commit atomically in the first stage and the plurality of store instructions retire in the first stage;

define a second stage of said TSC region for the frequently executed block of code wherein the plurality of store instructions commit atomically in the second stage;

and permit at least one additional memory instruction from outside of the TSC region to retire in the second stage.

17. The system of claim 16, wherein the binary optimization operations includes reordering of load and store instruction within the plurality of frequently executed instructions.

18. The system of claim 16, wherein the TSC optimizer code further causes the processor to: establish an execution threshold for the load and store instructions; monitor the load and store instructions during runtime and counting the number of executions thereof, and wherein, the frequently executed load and store instructions are instructions that exceed the execution threshold.

* * * * *

UNITED STATES PATENT AND TRADEMARK OFFICE
CERTIFICATE OF CORRECTION

PATENT NO. : 8,418,156 B2  
APPLICATION NO. : 12/639251  
DATED : April 9, 2013  
INVENTOR(S) : Cheng Wang et al.

Page 1 of 1

It is certified that error appears in the above-identified patent and that said Letters Patent is hereby corrected as shown below:

In the Claims:

In column 10, line 34, in claim 1, delete "maker" and insert -- marker --, therefor.

In column 10, line 37, in claim 1, delete "maker" and insert -- marker --, therefor.

In column 11, line 47, in claim 9, delete "maker" and insert -- marker --, therefor.

In column 11, line 50, in claim 9, delete "maker" and insert -- marker --, therefor.

In column 12, line 57, in claim 16, delete "maker" and insert -- marker --, therefor.

In column 12, line 60, in claim 16, delete "maker" and insert -- marker --, therefor.

Signed and Sealed this  
Eleventh Day of June, 2013

Teresa Stanek Rea  
*Acting Director of the United States Patent and Trademark Office*